(12) United States Patent
Tong et al.

(10) Patent No.: US 8,802,766 B2
(45) Date of Patent: Aug. 12, 2014

(54) SILANE-CONTAINING POLYAMIDEIMIDE INTERMEDIATE TRANSFER MEMBERS

(75) Inventors: Yuhua Tong, Webster, NY (US); Dante M. Pietrantoni, Rochester, NY (US); Jin Wu, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 647 days.

(21) Appl. No.: 12/965,264

(22) Filed: Dec. 10, 2010

(65) Prior Publication Data
US 2012/0148316 A1 Jun. 14, 2012

(51) Int. Cl.
G03G 15/20 (2006.01)
(52) U.S. Cl.
USPC .......................................... 524/495
(58) Field of Classification Search
CPC ..................................... C08G 73/14
USPC ......................................... 524/495
See application file for complete search history.

(56) References Cited

U.S. PATENT DOCUMENTS

| | | | |
|---|---|---|---|
| 5,487,707 A | 1/1996 | Sharf et al. | |
| 6,139,784 A | 10/2000 | Oshima et al. | |
| 6,318,223 B1 | 11/2001 | Yu et al. | |
| 6,397,034 B1 | 5/2002 | Tarnawskyj et al. | |
| 6,440,515 B1 | 8/2002 | Thornton et al. | |
| 6,602,156 B2 | 8/2003 | Schlueter, Jr. | |
| 7,031,647 B2 | 4/2006 | Mishra et al. | |
| 7,130,569 B2 | 10/2006 | Goodman et al. | |
| 7,139,519 B2 | 11/2006 | Darcy, III et al. | |
| 7,993,735 B1* | 8/2011 | Pietrantoni et al. | 428/220 |
| 2009/0297962 A1* | 12/2009 | Wu | 430/58.8 |
| 2010/0247818 A1* | 9/2010 | Wu | 428/32.85 |

* cited by examiner

*Primary Examiner* — Ling Choi
*Assistant Examiner* — Lanee Reuther
(74) *Attorney, Agent, or Firm* — Eugene O. Palazzo

(57) ABSTRACT

An intermediate transfer member including a first supporting substrate layer, and a second layer of a silane-containing polyamideimide, and a filler component.

17 Claims, 1 Drawing Sheet

SILANE-CONTAINING POLYAMIDEIMIDE INTERMEDIATE TRANSFER MEMBERS

This disclosure relates to an intermediate transfer member comprising a supporting substrate, and thereover a layer comprising a silane-containing polyamideimide.

BACKGROUND

A number of intermediate transfer members, such as intermediate transfer belts selected for transferring a developed image in xerographic systems, are known. For example, there have been disclosed intermediate transfer belts that contain as supporting substrates polyimides, polyamideimides, or mixtures thereof, and a conductive component like carbon black. The resistivity of these intermediate transfer members can be adjusted by the use of a conductive filler component, such as carbon black. However, the conductive component, such as carbon black, can be difficult to properly disperse in the coating mixture used for preparation of the intermediate transfer member thus adversely affecting the resistivity of the intermediate transfer member. Also, in a number of known intermediate transfer members the stability of the conductive component dispersion is poor, resulting in aggregating and settling of the conductive component. This causes resistivity changes such as a decrease in resistivity and progressively poor xerographic developed image quality.

Other disadvantages that may be associated with intermediate transfer members relate to maintaining a stable resistivity for extended time periods in order to avoid degradation in the developed image to be transferred from the intermediate transfer member. Additionally, controlling and preselecting the resistivity of intermediate transfer members usually requires a uniform surface resistivity for extended time periods, which is difficult to achieve.

Moreover, rendering the surface of intermediate transfer members to allow release of the entire or substantially entire developed xerographic image from the member to a document like paper to provide improved transfer efficiency, and to permit xerographic images with continuous acceptable resolution, and substantially no settling or agglomeration of particles can be difficult to attain.

Thus, there is a need for intermediate transfer members that can be generated from coating mixtures with excellent dispersion quality and sufficient dispersion stability to permit a controlled member resistivity.

There is a need for intermediate transfer members with high transfer efficiency of the xerographic developed image, such as a transfer efficiency of from about 85 to about 100 percent, and where settling and agglomeration of the filler like carbon black is minimized. Further, sharper images with less or no defects are desired with intermediate transfer members that can be prepared in a more cost-effective manner.

Another need resides in providing intermediate transfer members where the surface coating dispersion is more uniform and stable than the supporting substrate upon which it is in contact.

These and other needs are, in embodiments, obtainable with the intermediate transfer members disclosed herein.

SUMMARY

Disclosed is an intermediate transfer member comprising a supporting substrate, and in contact with the supporting substrate a silane-containing polymer layer comprising a silane-containing polyamideimide.

Disclosed is an intermediate transfer member comprising a polyimide supporting substrate, and thereover a layer comprised of a mixture of a silane-containing polyamideimide, and a conductive component, wherein the silane-containing polyamideimide is selected from the group consisting of those represented by the following formulas/structures

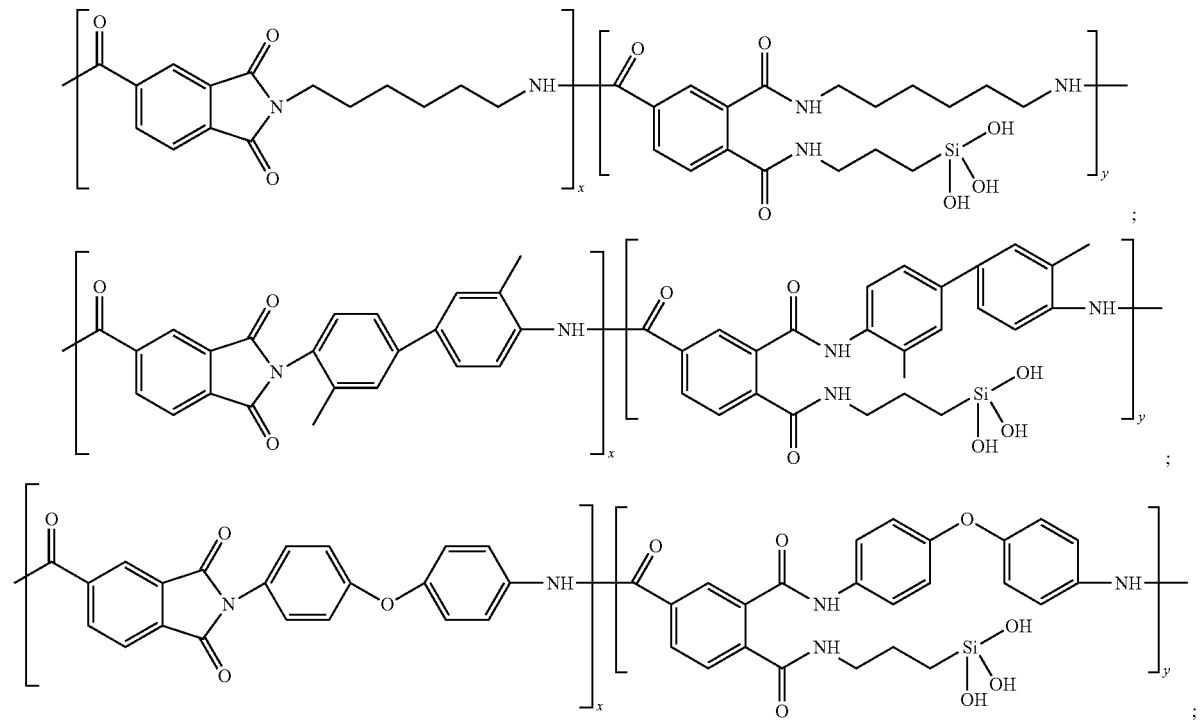

-continued

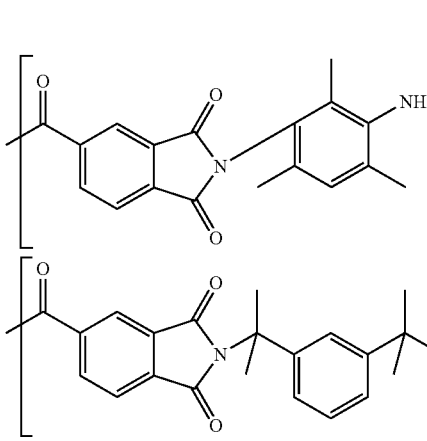
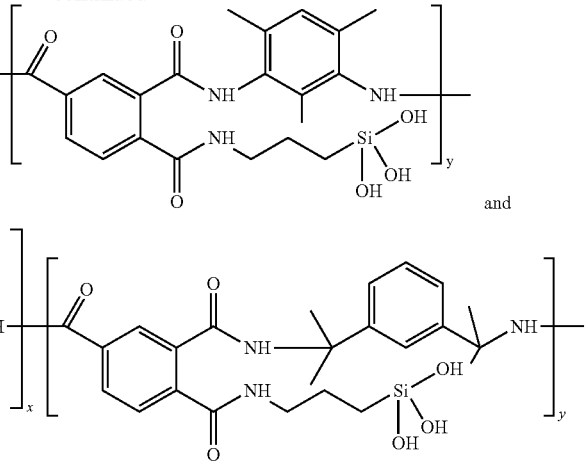

and where x is from about 65 to about 90 mole percent, y is from about 10 to about 35 mole percent, and the total of x and y is about 100 mole percent.

Disclosed is an intermediate transfer member comprising a silane-containing polyamideimide, and which member has a resistivity of from about $10^9$ to about $10^{13}$ ohm/square.

FIGURES

There are provided the following Figures to further illustrate the intermediate transfer members disclosed herein.

EMBODIMENTS

There is provided herein an intermediate transfer member comprising a supporting substrate, and thereover a silane-containing polymer layer comprising conductive filler, such as carbon black, dispersed in a silane-containing polyamideimide. An optional release layer can also be included over the silane-containing polymer layer.

Figure 1:
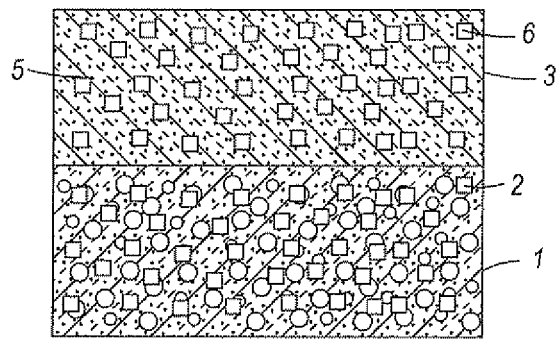
FIG. 1 illustrates an exemplary embodiment of an intermediate transfer member of the present disclosure.

In FIG. 1, there is illustrated an exemplary intermediate transfer member of the present disclosure comprising a supporting substrate 1, an optional carbon black component filler 2, a silane-containing polymer layer 3 thereover comprising a silane-containing polyamideimide 5, and an optional carbon filler 6.

Figure 2:
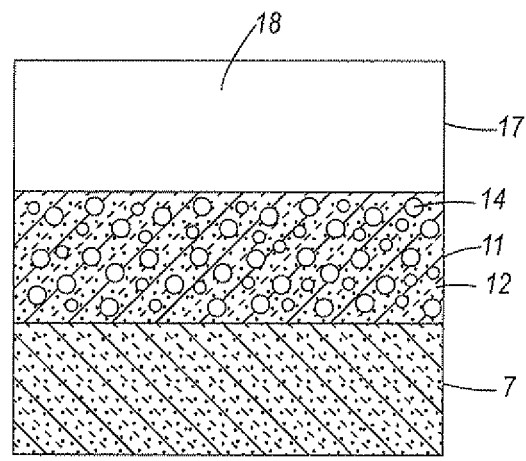
FIG. 2 illustrates an exemplary embodiment of another intermediate transfer member of the present disclosure.

In FIG. 2, there is illustrated another exemplary embodiment of the intermediate transfer member of the present disclosure comprising a supporting substrate layer 7, a silane-containing polymer layer 11 thereover comprising a silane-containing polyamideimide 12 and a conductive filler 14, and a release layer 17 comprising a release component 18.

The intermediate transfer members of the present disclosure generally comprise a silane-containing polymer layer formed over a supporting substrate. The silane-containing polymer layer generally comprises a silane-containing polyamideimide, and optionally a conductive filler such as carbon black dispersed in the silane-containing polyamideimide. The substrate generally comprises a polymer material, such as polyamideimide, and optionally a conductive filler such as carbon black dispersed in the polymer material. Where the conductive filler is dispersed in both layers of the supporting substrate and the silane-containing layer, the filler dispersion is more uniform and more stable in the silane-containing polymer layer. It is believed that this increased uniformity and stability arises due to interactions between silanol moieties of the silane-containing polyamideimide and acidic groups on the surface of the conductive filler.

The intermediate transfer member can be provided in any of a variety of configurations, such as a two-layer configuration described above, a three-layer configuration including an additional release layer, or the like. The final intermediate transfer member may be in the form of an endless flexible belt, a web, a rigid cylinder, a sheet, a drelt (a cross between a drum and a belt), and the like.

The silane-containing polymer layer generally comprises a silane-containing polyamideimide, and optionally a conductive filler, such as carbon black, dispersed in the silane-containing polyamideimide. Each of these components is now discussed in more detail.

Silane-Containing Polyamideimide

As the silane-containing polyamideimide used in the intermediate transfer member, any suitable silane-containing polyamideimide can be selected. The silane-containing polyamideimide used in embodiments generally corresponds to a polyamideimide that has silanol groups introduced into the polymer chain. As such, the polyamideimide structure can be a polyamideimide homopolymer, a polyamideimide copolymer, or a higher order polyamideimide polymer. Furthermore, the silane-containing polyamideimide can include two or more different polyamideimide units.

For example, suitable silane-containing polyamideimides selected for forming the silane-containing polymer layer can be represented by the following formulas/structures

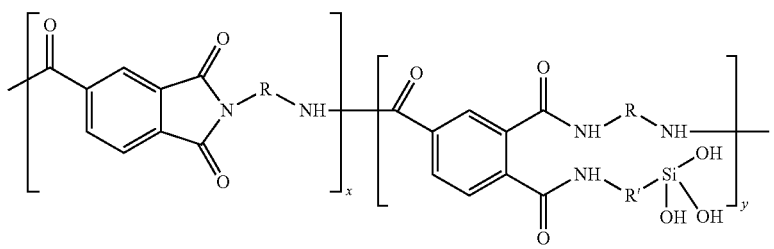

where x and y each represents the mole percent of the repeating segment, where x is from about 50 to about 99 mole percent, from about 70 to about 95 mole percent, from about 70 to about 90 mole percent, from about 65 to about 90 mole percent, from about 70 to about 80 mole percent, and y is from about 1 to about 50 mole percent, from about 10 to about 35 mole percent, from about 10 to about 30 mole percent, from about 20 to about 35 mole percent, from about 20 to about 30 mole percent, or from about 5 to about 30 mole percent, and the total or sum of x and y is about 100 mole percent; R and R' each independently represents a straight or branched chain alkyl group with from about 1 to about 18 carbon atoms, from 2 to about 12 carbon atoms, from about 4 to about 8 carbon atoms, from about 3 to about 10 carbon atoms, from about 1 to about 8 carbon atoms, or from about 2 to about 4 carbon atoms, or aryl groups or aryl substituents with from about from 6 to about 36, from about 6 to about 24, from about 6 to about 18, or from 6 to about 12 carbon atoms.

Examples of alkyl groups and isomers thereof are methyl, ethyl, propyl, butyl, pentyl, hexyl, heptyl, octyl, nonyl, decyl, undecyl, dodecyl, tridecyl, tetradecyl, pentadecyl, hexyldecyl, octadecyl, and nonyldecyl. Specific examples of aryl groups are phenyl, naphthyl, anthryl, phenanthryl, acenaphthyl, pyrene, chrysene, and substituted derivatives thereof.

Specific examples of suitable silane-containing polyamideimides are selected from the group consisting of those represented by the following formulas/structures

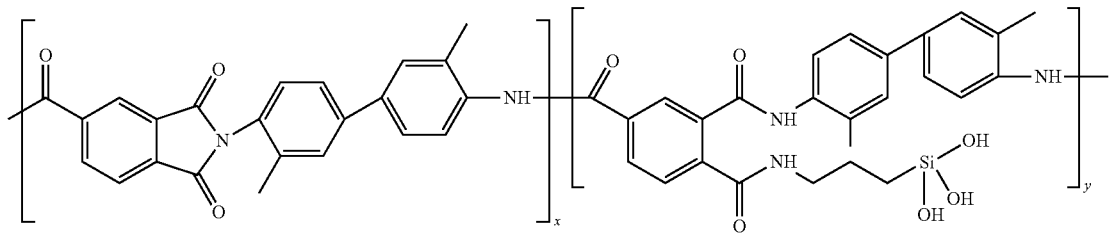

;

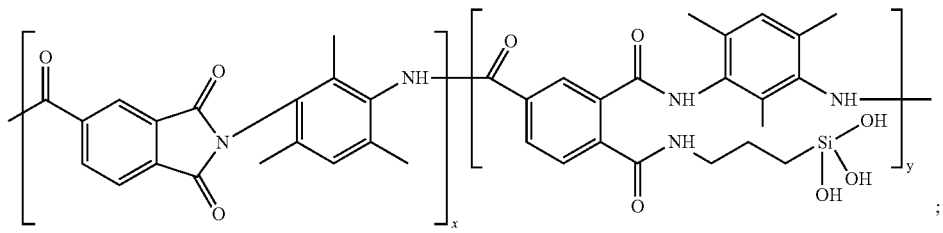

;

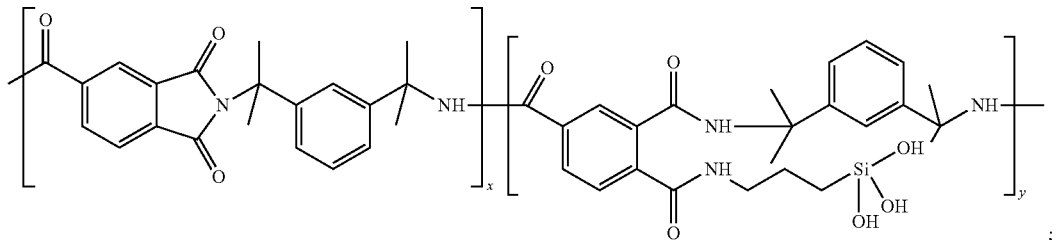

;

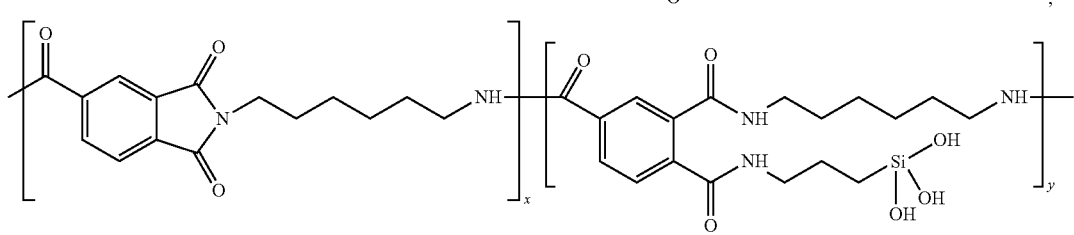

and

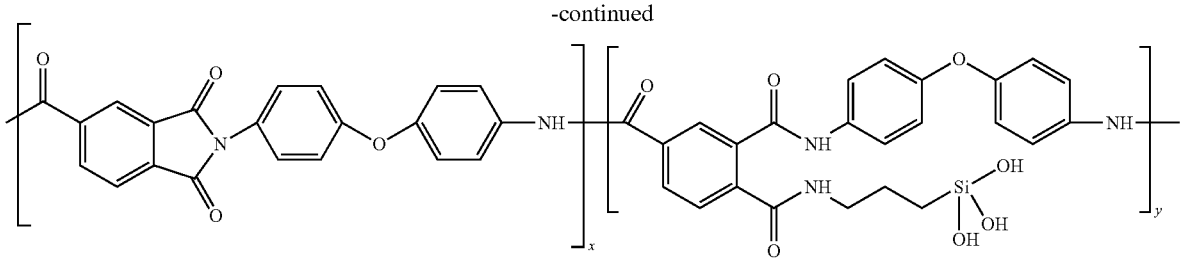

where x and y each represents the mole percents of the repeating segments as illustrated herein.

The silane-containing polyamideimide is present in various effective amounts, such as from about 100 weight percent, from about 60 to about 97, from about 70 to about 100, from about 70 to about 95, from about 75 to about 85, from about 65 to about 80, from about 80 to about 90, or from about 70 to about 90 weight percent, based on the total weight percent of the silane-containing polyamideimide and additional components, such as fillers like carbon black, that are present in the silane-containing polymer layer.

The number average molecular weight ($M_n$) of the silane-containing polyamideimide is from about 3,000 to about 30,000, from about 7,000 to about 15,000, or from about 5,000 to about 10,000 and the ($M_w$) weight average molecular weight of the silane-containing polyamideimide is from about 5,000 to about 100,000, from about 10,000 to about 50,000, or from about 25,000 to about 45,000, which molecular weights are determined by known methods, such as GPC analysis.

The silane-containing polyamideimide can be formed in accordance with a chemical reaction between an isocyanate, a trimellitic anhydride, and an aminosilane, wherein the isocyanate is a diisocyanate represented by

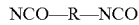

where R represents a straight or branched alkyl group with from about 1 to about 18 carbon atoms, from 2 to about 12 carbon atoms, from about 4 to about 8 carbon atoms, from about 3 to about 10 carbon atoms, or from about 2 to about 4 carbon atoms, or aryl groups or aryl substituents with from about from 6 to about 36, from about 6 to about 24, from about 6 to about 18, or from 6 to about 12 carbon atoms; and where the aminosilane is represented by

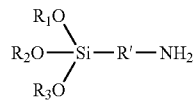

wherein R' is an alkylene group, straight chain or branched, containing from 1 to about 12 carbon atoms or from about 2 to about 8 carbon atoms; and $R_1$, $R_2$ and $R_3$ are independently selected from an alkyl group containing from 1 to about 10 carbon atoms or from 1 to about 4 carbon atoms.

Examples of the isocyanate that can be selected for the preparation of the silane-containing polyamideimides include 1,3-phenylene diisocyanate, 1,4-phenylene diisocyanate, 3,3'-dimethoxy-4,4'-biphenylene diisocyanate, isophorone diisocyanate, m-xylylene diisocyanate, toluene 2,4-diisocyanate, trans-1,4-cyclohexylene diisocyanate, 2,4,6-trimethyl-1,3-phenylene diisocyanate, 1,4-diisocyanatobutane, 1,6-diisocyanatohexane, 1,8-diisocyanatooctane, 1,3-bis(1-isocyanato-1-methylethyl)benzene, and the like, and mixtures thereof.

Specific examples of the aminosilane that can be used to form the silane-containing polyamideimide include 3-aminopropyl triethoxysilane, 3-aminopropyl trimethoxysilane, 4-aminobutyl triethoxysilane, 4-aminobutyl trimethoxysilane, 2-aminoethyl triethoxysilane, 2-aminoethyl trimethoxysilane, and the like, and mixtures thereof.

In an embodiment, the formation of a silane-containing polyamideimide can be represented by the following reactions

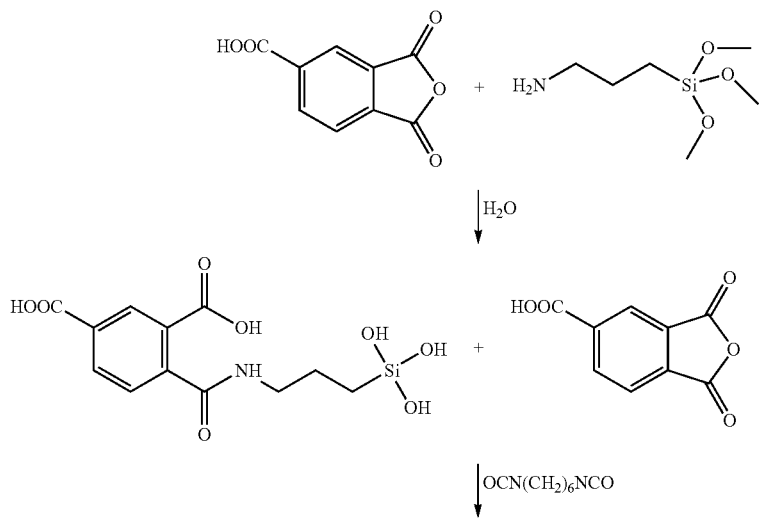

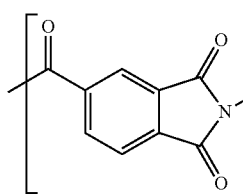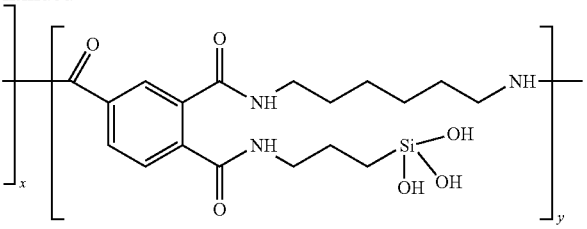

wherein x and y are mole percents as illustrated herein, and more specifically, where a trimellitic anhydride is mixed with an aminosilane, such as 3-aminopropyl trimethoxysilane in a solvent such as NMP. The resulting reaction mixture is heated at a temperature of from about 40° C. to about 80° C., and in embodiments about 65° C. for a period of time of from about 0.5 to about 4 hours, and in embodiments about 2 hours. Thereafter, a small amount of water is added to the resulting mixture to hydrolyze the silane, and the resulting solution obtained is heated to a temperature of from about 100° C. to about 160° C., or from about 110° C. to about 125° C. The solution resulting is then cooled to room temperature, about 25° C., and a diisocyanate, such as 1,6-diisocyanatohexane, is added to the obtained solution. The mixture resulting is then heated to reflux at a temperature of from about 200° C. to about 220° C., and in embodiments, about 210° C. for a period of from about 12 to about 24 hours, and in embodiments about 16 hours. After cooling down to room temperature, a viscous brownish liquid is obtained, and is identified as a silane-containing polyamideimide by NMR.

By introducing the silanol groups into the polyamideimide chain, it is believed that the silanol moieties from the hydrolyzed silane in the silane-containing polyamideimide interacts with the acidic groups on the conductive filler, like the carbon black surface, thus preventing or minimizing the aggregating and settling of the carbon black. In addition, the silane-containing polyamideimide surface layer has strong adhesion to the bottom supporting substrate layer due to their structure similarity and the silanol bonds. The silane-containing polymer layer itself has a high modulus as illustrated herein, and a substantially stable suitable resistivity.

Optional Polymer Binder

In embodiments of the present disclosure, the silane-containing polymer layer can further include an optional additional polymeric binder. This additional polymeric binder can be included in the silane-containing polymer layer in addition to the silane-containing polyamideimide. Examples of suitable such additional polymeric binders include a polyimide, a polyamideimide, a polycarbonate, a polyphenylene sulfide, a polyamide, a polysulfone, a polyetherimide, a polyester, a polyvinylidene fluoride, a polyethylene-co-polytetrafluoroethylene, and the like, and mixtures thereof. Suitable examples of polyamideimides include those described herein as being useful for the supporting substrate.

When an additional polymeric binder is included, it can be included in any desirable and effective amount. For example, the additional polymeric binder can be present in an amount of from about 1 to about 25 weight percent, such as from about 1 to about 15 or from about 1 to about 10 weight percent, based on a total weight of the silane-containing polymer layer.

Filler

In embodiments, a conductive filler or fillers, such as a carbon black, a metal oxide, a polyaniline, or mixtures thereof, can be included in the optional supporting substrate, in the silage containing polymer layer, or in both the supporting substrate and the silage containing layer. When included, the filler can be present in an amount of from about 1 to about 60 weight percent, from about 3 to about 40 weight percent, from about 5 to about 30 weight percent, from about 20 to about 35 weight percent, from about 20 to about 30 weight percent, or from about 10 to about 20 weight percent, based on the total weight percent of the conductive filler and the silane-containing polyamideimide present in the silane-containing polymer layer.

The conductive filler can be of various sizes, such as from about 100 to about 300, from about 100 to about 200, from about 125 to about 175, or from about 150 to about 165 nanometers as measured with an electron microscope.

Examples of carbon blacks that can be selected as the conductive filler include VULCAN® carbon blacks, REGAL® carbon blacks, MONARCH® carbon blacks and BLACK PEARLS® carbon blacks available from Cabot Corporation. Specific examples of conductive carbon blacks are BLACK PEARLS® 1000 (B.E.T. surface area=343 m$^2$/g, DBP absorption=1.05 ml/g), BLACK PEARLS® 880 (B.E.T. surface area=240 m$^2$/g, DBP absorption=1.06 ml/g), BLACK PEARLS® 800 (B.E.T. surface area=230 m$^2$/g, DBP absorption=0.68 ml/g), BLACK PEARLS® L (B.E.T. surface area=138 m$^2$/g, DBP absorption=0.61 ml/g), BLACK PEARLS® 570 (B.E.T. surface area=110 m$^2$/g, DBP absorption=1.14 ml/g), BLACK PEARLS® 170 (B.E.T. surface area=35 m$^2$/g, DBP absorption=1.22 ml/g), VULCAN® XC72 (B.E.T. surface area=254 m$^2$/g, DBP absorption=1.76 ml/g), VULCAN® XC72R (fluffy form of VULCAN® XC72), VULCAN® XC605, VULCAN® XC305, REGAL® 660 (B.E.T. surface area=112 m$^2$/g, DBP absorption=0.59 ml/g), REGAL® 400 (B.E.T. surface area=96 m$^2$/g, DBP absorption=0.69 ml/g), REGAL® 330 (B.E.T. surface area=94 m$^2$/g, DBP absorption=0.71 ml/g), MONARCH® 880 (B.E.T. surface area=220 m$^2$/g, DBP absorption=1.05 ml/g, primary particle diameter=16 nanometers), and MONARCH® 1000 (B.E.T. surface area=343 m$^2$/g, DBP absorption=1.05 ml/g, primary particle diameter=16 nanometers); Channel carbon blacks available from Evonik-Degussa; Special Black 4 (B.E.T. surface area=180 m$^2$/g, DBP absorption=1.8 ml/g, primary particle diameter=25 nanometers), Special Black 5 (B.E.T. surface area=240 m$^2$/g, DBP absorption=1.41 ml/g, primary particle diameter=20 nanometers), Color Black FW1 (B.E.T. surface area=320 m$^2$/g, DBP absorption=2.89 ml/g, primary particle diameter=13 nanometers), Color Black FW2 (B.E.T. surface area=460 m$^2$/g, DBP absorption=4.82 ml/g, primary particle diameter=13 nanometers), and Color Black FW200 (B.E.T. surface area=460 m$^2$/g, DBP absorption=4.6 ml/g, primary particle diameter=13 nanometers). Other known suitable carbon blacks not specifically disclosed herein may be selected as the conductive filler component for the intermediate transfer member disclosed herein.

Examples of polyaniline that can be used are PANIPOL™ F, commercially available from Panipol Oy, Finland; and known lignosulfonic acid grafted polyanilines. These polyanilines usually have a relatively small particle size diameter of from about 0.5 to about 5 microns.

Metal oxides that can be selected as a filler component include tin oxide, antimony doped tin oxide, indium oxide, indium doped tin oxide, zinc oxide, titanium oxide, and the like, and mixtures thereof.

Silane-Containing Polymer Layer Formation

The silane-containing polyamideimide polymer and optional filler can be formulated into a polymer layer by any suitable method. For example, with known milling processes, uniform dispersions of the components, can be obtained, and then coated onto supporting substrates using a known draw bar or other coating method. The resulting individual film or films can be dried at high temperatures, such as by heating of from about 100° C. to about 400° C., or from about 160° C. to about 300° C., for a suitable period of time, such as from about 20 to about 180 minutes, or from about 40 to about 120 minutes, while remaining on the substrates. The resultant films can have a thickness of from about 15 to about 150 microns, from about 20 to about 100 microns, or from about 25 to about 75 microns.

Examples of solvents selected for formation of the polymer and filler component mixture, which solvents can be selected in an amount of from about 60 to about 95 weight percent, or from about 70 to about 90 weight percent of the total coating dispersion for the polymer layer mixture include alkylene halides such as methylene chloride, tetrahydrofuran, toluene, monochlorobenzene, N-methyl-2-pyrrolidone (NMP), N,N-dimethylformamide, N,N-dimethylacetamide, methyl ethyl ketone, methyl isobutyl ketone, mixtures thereof, and the like.

Supporting Substrate

In embodiments the coating dispersion of the silane-containing polyamideimide and the conductive component can be coated on a supporting substrate. Examples of suitable supporting substrate materials include a polyimide, a polyamideimide, a polyetherimide, and mixtures thereof.

More specifically, examples of the intermediate transfer member supporting substrates are polyimides inclusive of known low temperature, and rapidly cured polyimide polymers, such as VTEC™ PI 1388, 080-051, 851, 302, 203, 201, and PETI-5, all available from Richard Blaine International, Incorporated, Reading, Pa. These thermosetting polyimides can be cured at temperatures of from about 180 to about 260° C. over a short period of time, such as from about 10 to about 120 minutes, or from about 20 to about 60 minutes; possess a number average molecular weight of from about 5,000 to about 500,000, or from about 10,000 to about 100,000, and a weight average molecular weight of from about 50,000 to about 5,000,000, or from about 100,000 to about 1,000,000. Also, for the supporting substrate there can be selected thermosetting polyimides that can cured at temperatures of above 300° C., such as PYRE M.L.® RC-5019, RC 5057, RC-5069, RC-5097, RC-5053, and RK-692, all commercially available from Industrial Summit Technology Corporation, Partin, N.J.; RP-46 and RP-50, both commercially available from Unitech LLC, Hampton, Va.; DURIMIDE® 100, commercially available from FUJIFILM Electronic Materials U.S.A., Inc., North Kingstown, R.I.; and KAPTON® HN, VN and FN, all commercially available from E.I. DuPont, Wilmington, Del.

Examples of polyamideimides that can be selected as supporting substrates are VYLOMAX® HR-11NN (15 weight percent solution in (NMP) N-methylpyrrolidone, $T_g=300°$ C., and $M_w=45,000$), HR-12N2 (30 weight percent solution in N-methylpyrrolidone/xylene/methyl ethyl ketone=50/35/15, $T_g=255°$ C., and $M_w=8,000$), HR-13NX (30 weight percent solution in N-methylpyrrolidone/xylene=67/33, $T_g=280°$ C., and $M_w=10,000$), HR-15ET (25 weight percent solution in ethanol/toluene=50/50, $T_g=260°$ C., and $M_w=10,000$), HR-16NN (14 weight percent solution in N-methylpyrrolidone, $T_g=320°$ C., and $M_w=100,000$), all commercially available from Toyobo Company of Japan, and TORLON® AI-10 ($T_g=272°$ C.), commercially available from Solvay Advanced Polymers, LLC, Alpharetta, Ga.

Examples of polyetherimide supporting substrates are ULTEM® 1000 ($T_g=210°$ C.), 1010 ($T_g=217°$ C.), 1100 ($T_g=217°$ C.), 1285, 2100 ($T_g=217°$ C.), 2200 ($T_g=217°$ C.), 2210 ($T_g=217°$ C.), 2212 ($T_g=217°$ C.), 2300 ($T_g=217°$ C.), 2310 ($T_g=217°$ C.), 2312 ($T_g=217°$ C.), 2313 ($T_g=217°$ C.), 2400 ($T_g=217°$ C.), 2410 ($T_g=217°$ C.), 3451 ($T_g=217°$ C.), 3452 ($T_g=217°$ C.), 4000 ($T_g=217°$ C.), 4001 ($T_g=217°$ C.), 4002 ($T_g=217°$ C.), 4211 ($T_g=217°$ C.), 8015, 9011 ($T_g=217°$ C.), 9075, and 9076, all commercially available from Sabic Innovative Plastics.

Once formed, the supporting substrate can have any desired and suitable thickness. For example, the supporting substrate can have a thickness of from about 10 to about 300 microns, such as from about 50 to about 150 microns, or from about 75 to about 125 microns.

If desired, a conductive filler or fillers can also be included in the supporting substrate. Suitable conductive filler or fillers that can be included in the supporting substrate include those fillers described above as suitable for use in the silane-containing polymer layer. In embodiments, where a conductive filler is included in both the silane-containing polymer layer and the supporting substrate, the filler used in each layer can be the same or different. When included in the substrate, the filler can be present in an amount of from about 1 to about 60 weight percent, from about 3 to about 40 weight percent, from about 5 to about 30 percent, or from about 10 to about 20 weight percent.

Optional Release Layer

The intermediate transfer member may further include an optional outer release layer present on the silane-containing polymer layer. The release layer can be included to alter the surface characteristics of the intermediate transfer member to allow easier release of toner material from the intermediate transfer member.

Exemplary materials that are suitable for use in a release layer include TEFLON®-like materials including fluorinated ethylene propylene copolymer (FEP), polytetrafluoroethylene (PTFE), polyfluoroalkoxy polytetrafluoroethylene (PFA TEFLON®), and other TEFLON®-like materials; silicone materials, such as fluorosilicones and silicone rubbers, such as Silicone Rubber 552, available from Sampson Coatings, Richmond, Va., (polydimethyl siloxane/dibutyl tin diacetate, 0.45 gram DBTDA per 100 grams polydimethyl siloxane rubber mixture, with a molecular weight $M_w$ of approximately 3,500); and fluoroelastomers, such as those sold as VITON®, such as copolymers and terpolymers of vinylidenefluoride, hexafluoropropylene, and tetrafluoroethylene, which are known commercially under various designations as VITON A®, VITON E®, VITON E60C®, VITON E45®, VITON E430®, VITON B910®, VITON GH®, VITON B50®, VITON E45®, and VITON GF®. The VITON® designation is a Trademark of E.I. DuPont de Nemours, Inc. Two known fluoroelastomers are comprised of (1) a class of copolymers of two of vinylidenefluoride, hexafluoropropylene, and tetrafluoroethylene, known commercially as VITON A®; and (2) a class of terpolymers of vinylidenefluoride, hexafluoropropylene, and tetrafluoroethylene, known commercially as VITON B®; and (3) a class of tetrapolymers of vinylidenefluoride, hexafluoropropylene, tetrafluoroethylene, and a cure site monomer, such fluoroelastomers being known as VITON GF®, having about 35 mole percent of vinylidenefluoride, about 34 mole percent of hexafluoropropylene, about 29 mole percent of tetrafluoroethylene with about 2 percent cure site monomer. The cure site monomer can be those that are available from E.I. DuPont de Nemours, Inc. such as 4-bromoperfluorobutene-1, 1,1-dihydro-4-bromoperfluorobutene-1, 3-bromoperfluoropropene-1, 1,1-dihydro-3-bromoperfluoropropene-1, or any other suitable, known, commercially available cure site monomers.

The release layer or layers may be deposited on the silane-containing polymer layer by a number of known coating processes. Known methods for forming the outer release layer include dipping, spraying such as by multiple spray applications of very thin films, casting, flow-coating, web-coating, roll-coating, extrusion, molding, or the like. Usually it is desirable to deposit the layers by spraying such as by multiple spray applications of very thin films, casting, by web coating, by flow-coating, and more specifically, by laminating.

The intermediate transfer member coating mixtures disclosed herein exhibit, in embodiments, an excellent functional resistivity as measured with a known High Resistivity Meter, of from about $10^9$ to about $10^{13}$, from about $10^9$ to about $10^{12}$, from about $10^{10}$ to about $10^{12}$, or from about $10^{10}$ to about $10^{11}$ ohm/square as illustrated herein, a high modulus of from about 2,000 to about 8,000 MPa, from about 2,000 to about 7,000, from about 3,000 to about 8,000, from about 3,000 to about 5,000 MPa, where the silane-containing polyamideimide has a glass transition temperature (Tg) of from about 200° C. to about 400° C., from about 225° C. to about 375° C., from about 250° C. to about 350° C., or from about 275° C. to about 340° C., where MPa refers to Mega Pascal as measured by the use of a known Pascal device, and the glass transition temperature Tg is measured by Differential Scanning calorimetry or DSC. The supporting substrate layer possesses a resistivity of from about $10^9$ to about $10^{13}$, from about $10^9$ to about $10^{11}$, from about $10^{10}$ to about $10^{12}$ ohm/square, or from about $2.1 \times 10^{10}$ to about $3 \times 10^{10}$ ohm/square. The intermediate transfer members, in embodiments, permit the transfer of from about 90 to about 99 percent of a xerographic developed image from the member to paper.

The intermediate transfer member present in the imaging systems illustrated herein, and other known imaging and printing systems may be in the configuration of a sheet, a web, a belt, including an endless belt, and an endless seamed flexible belt; a roller, a film, a foil, a strip, a coil, a cylinder, a drum, an endless strip, and a circular disc. The circumference of the intermediate transfer member, especially as it is applicable to a film or a belt configuration, is from about 275 to about 2,700 millimeters, from about 1,700 to about 2,600 millimeters, or from about 2,000 to about 2,200 millimeters with a corresponding width of from about 100 to about 1,000 millimeters, from about 200 to about 500 millimeters, or from about 300 to about 400 millimeters.

The intermediate transfer members illustrated herein like intermediate transfer belts can be selected for a number of printing and copying systems, inclusive of xerographic printing systems. For example, the disclosed intermediate transfer members can be incorporated into a multi-imaging xerographic machine where each developed toner image to be transferred is formed on the imaging or photoconductive drum at an image forming station, and where each of these images is then developed at a developing station, and transferred to the intermediate transfer member. The images may be formed on a photoconductor and developed sequentially, and then transferred to the intermediate transfer member. In an alternative method, each image may be formed on the photoconductor or photoreceptor drum, developed, and then transferred in registration to the intermediate transfer member. In an embodiment, the multi-image system is a color copying system, wherein each color of an image being copied is formed on the photoreceptor drum, developed, and transferred to the intermediate transfer member.

After the toner latent image has been transferred from the photoreceptor drum to the intermediate transfer member, the intermediate transfer member may be contacted under heat and pressure with an image receiving substrate such as paper. The toner image on the intermediate transfer member is then transferred and fixed, in image configuration, to the substrate such as paper.

Specific embodiments will now be described in detail. These examples are intended to be illustrative, and are not limited to the materials, conditions, or process parameters set forth in these embodiments. All parts are percentages by weight of total solids unless otherwise indicated. The molecular weights were determined by GPC analysis.

Comparative Example 1

Preparation of Polyamideimide Intermediate Transfer Member (ITM)

Fourteen (14) grams of the polyamideimide (PAI) solution, VYLOMAX® HR-11NN (15 weight percent solution in N-methylpyrrolidone, NMP, $T_g=300°$ C., and $M_w=45,000$, obtained from Toyobo) were mixed with 1.5 grams of a dispersion of NMP and carbon black 4 (B.E.T. surface area=180 m²/g, DBP absorption=1.8 ml/g, primary particle diameter=25 nanometers, obtained from Evonik-Degussa) resulting in a solids content of 21 weight percent. After roll mixing for 30 minutes, the dispersion resulting was coated on a polyimide/polyaniline supporting substrate (about 75 microns thick, available from DuPont) by a Bird bar. The resulting dual layer ITM was dried in an air circulating oven at 170° C. for 1 hour. There resulted a dual layer intermediate transfer member with a 75 micron thick polyimide/polyaniline bottom layer, and a 20 micron thick PAI surface layer comprising PAI/carbon black in a ratio of 87/13.

Example I

Preparation of Silane-Containing Polyamideimide ITM

In a 1,000 milliliter glass reactor equipped with mechanical stirring and Dean-Stark receiver attached to a water cooling condenser, and under flowing nitrogen, trimellitic anhydride (19.8 grams) was dissolved in 200 milliliters of NMP 3-aminopropyltrimethoxysilane, 8.4 grams was then added dropwise to the aforementioned NMP mixture. Subsequently, the resulting mixture was heated at 65° C. for 2 hours; 1.2 grams of water were then added, and the solution obtained was heated to 120° C. for 2 hours, followed by removal of the heating source. After the solution was cooled down to room temperature, about 25° C., 1,6-diisocyanatohexane (16.8 grams) was added into the reactor mixture. The mixture resulting was then heated to refluxing at a temperature of 210° C. for 16 hours. After cooling down to room temperature, a viscous brownish liquid was obtained with the following structure (Si—PAI) as determined by NMR analysis

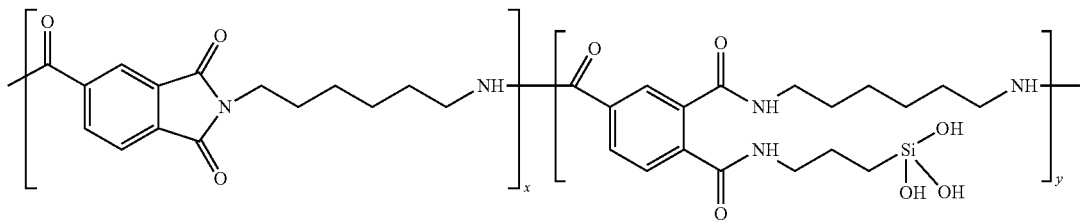

where x is about 90 mole percent, and y is about 10 mole percent; the number average molecular weight is about 8,000, and the weight average molecular weight is about 50,000 as determined by GPC analysis.

Twelve grams of the above silane-containing polyamide-imide (Si—PAI) solution with a solid content of about 18 weight percent in NMP was mixed with 1.5 grams of carbon black 4 (B.E.T. surface area=180 m$^2$/g, DBP absorption=1.8 ml/g, primary particle diameter=25 nanometers, obtained from Evonik-Degussa) dispersion in NMP and with a solids content of 21 weight percent. After being roll mixed for 30 minutes, the resulting dispersion was coated with a Bird bar on a supporting substrate of a polyimide/polyaniline (about 75 microns thick, available from E.I. DuPont). The resulting dual layer ITM was dried in an air circulating oven at 170° C. for 1 hour. There resulted a dual layer ITM with a 75 micron thick polyimide/polyaniline bottom supporting substrate layer, and a 23 micron thick Si—PAI surface layer comprising Si—PAI/carbon black in a ratio of 87/13.

Particle Size Measurements

The surface layer dispersions of Comparative Example 1 and Example I in NMP were measured with a known Horiba particle analyzer for carbon black particle size when they were freshly prepared (time or t=0), and measured again after 30 days (t=30 days), and the results are shown in Table 1.

TABLE 1

| Particle size (nm) | At t = 0 | At t = 30 Days |
| --- | --- | --- |
| Comparative Example 1 (PAI/carbon black) | 250 nm | 500 nm |
| Example I (Si-PAI/carbon black) | 100 nm | 120 nm |

For the Example I (Si—PAI/carbon black) dispersion, the carbon black particle size was 100 nanometers at time t=0, and only increased about 20 percent after 30 days, which indicated an excellent dispersion that was stable with substantially no agglomeration of the components of the carbon black and the silane-containing polyamideimide, and substantially no settling or agglomeration of the solid mixture particles. In contrast, for the Comparative Example 1 (PAI/carbon black) dispersion, the carbon black particle size was 2.5 times larger than that of the Example I (Si—PAI/carbon black) dispersion, and for the Comparative Example 1 the size increased quickly by 100 percent after 30 days, which indicated a poor dispersion, and resulted in agglomeration and settling of solid particles.

Incorporation of the silane-containing moiety into a polyamideimide resulting in a silane-containing polyamideimide thus improved the carbon black dispersion quality.

While not being desired to be limited by theory, it is believed that the silanol moieties in the Si—PAI copolymer interact with the acidic groups on the carbon black surface, thus preventing the carbon black from aggregating and settling.

Surface Resistivity Measurement

The above ITM members of Examples I and Comparative Example 1 were measured for surface resistivity (10 measurements at varying spots, 72° F./50 percent room humidity) using a High Resistivity Meter (Hiresta-Up MCP-HT450 from Mitsubishi Chemical Corp.). The resistivity results are provided in Table 2.

TABLE 2

| | Surface Resistivity (ohm/square) |
| --- | --- |
| Comparative Example 1 (PAI/carbon black) | From $1.9 \times 10^{10}$ to $9.8 \times 10^{10}$ |
| Example I (Si-PAI/carbon black) | From $2.1 \times 10^{10}$ to $3.0 \times 10^{10}$ |

For the Example I (Si—PAI/carbon black) ITM, the surface resistivity ranges from about $2.1 \times 10^{10}$ to $3.0 \times 10^{10}$ ohm/square, an about 0.15 order of magnitude change. In contrast, for the Comparative Example 1 (PAI/carbon black) ITM, the surface resistivity ranges from about $1.9 \times 10^{10}$ to $9.8 \times 10^{10}$ ohm/square, an about 0.71 order of magnitude change. These results indicate a more suitable dispersion quality for the Example I (Si—PAI/carbon black) mixture, resistivity control, and less resistivity variation for the Example I (Si—PAI/carbon black) ITM.

The claims, as originally presented and as they may be amended, encompass variations, alternatives, modifications, improvements, equivalents, and substantial equivalents of the embodiments and teachings disclosed herein, including those that are presently unforeseen or unappreciated, and that may arise from applicants/patentees and others. Unless specifically recited in a claim, steps or components of claims should not be implied or imported from the specification or any other claims as to any particular order, number, position, size, shape, angle, color, or material.

What is claimed is:

1. An intermediate transfer member comprising a supporting substrate, and in contact with said supporting substrate a silane-containing polymer layer comprising a silane-containing polyamideimide represented by the following formulas/structures

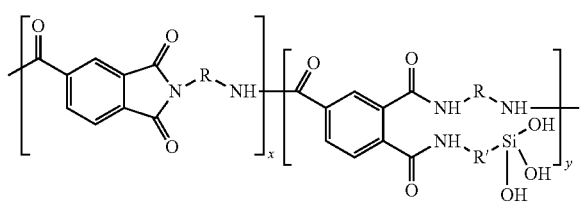

wherein x and y each represents the mole percent of the repeating segment, and x is from about 50 to about 99 mole percent, y is from about 1 to about 50 mole percent, and the total of x and y is about 100 mole percent; R is selected from the group consisting of alkyl groups with from about 1 to about 18 carbon atoms, and aryl groups with from about 6 to about 36 carbon atoms, and R' is an alkyl group.

2. An intermediate transfer member in accordance with claim 1 further containing a conductive filler component in at least one of the supporting substrate and the silane-containing polymer layer.

3. An intermediate transfer member in accordance with claim 2 wherein said conductive filler component is carbon black.

4. An intermediate transfer member in accordance with claim 1 wherein said silane-containing polyamideimide has a number average molecular weight of from about 3,000 to about 30,000, and a weight average molecular weight of from about 5,000 to about 100,000.

5. An intermediate transfer member in accordance with claim 1 wherein x is from about 70 to about 90 mole percent, y is from about 10 to about 30 mole percent; said R alkyl contains from about 4 to about 8 carbon atoms, said R aryl contains from about 6 to about 24 carbon atoms, and said R' alkyl contains from about 1 to about 8 carbon atoms.

6. An intermediate transfer member in accordance with claim 1 wherein said silane-containing polyamideimide is selected from the group consisting of the following formulas/structures

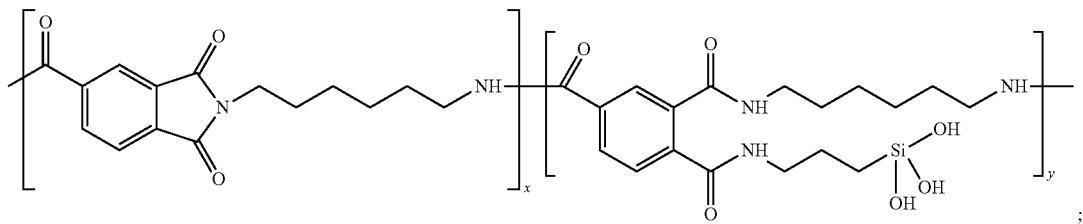
;

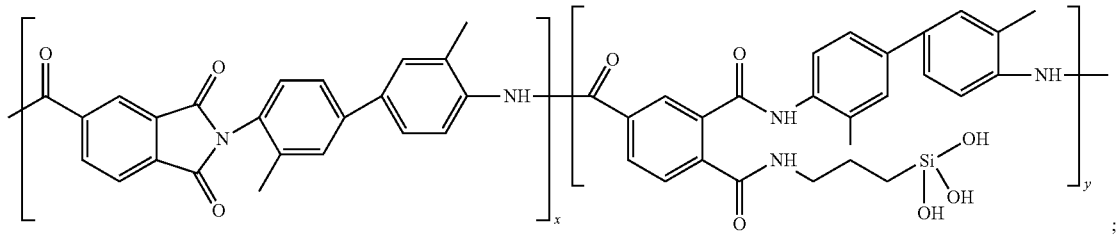
;

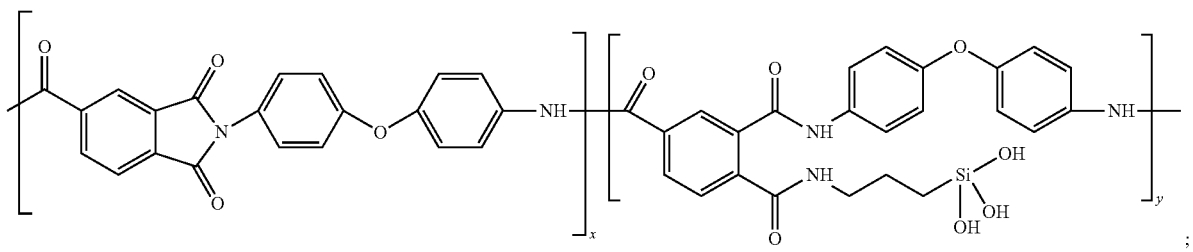
;

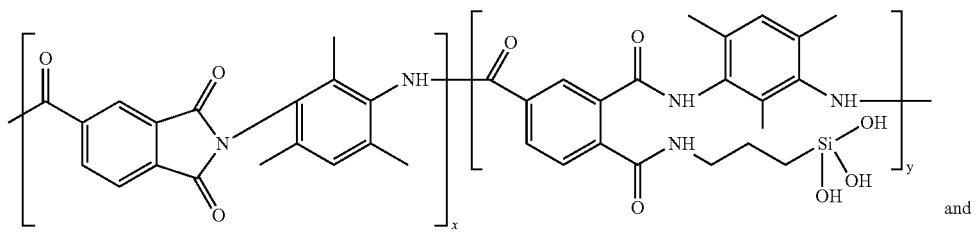
and

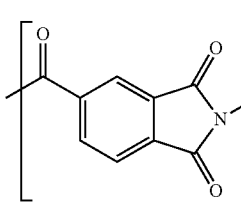
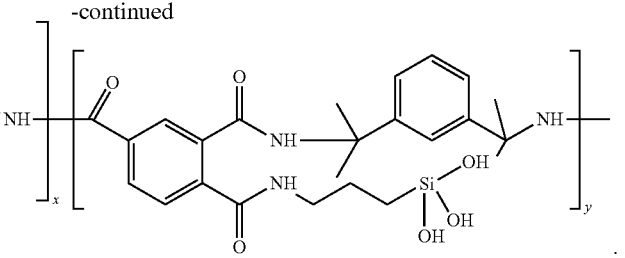

7. An intermediate transfer member in accordance with claim 1 wherein said silane-containing polyamideimide is present in an amount of from about 65 to about 80 weight percent, and said silane-containing polymer layer further comprises a conductive filler component present in an amount of from about 20 to about 35 weight percent, and the total thereof of said silane-containing polyamideimide and said conductive filler is about 100 weight percent, and wherein said supporting substrate comprises a polyimide with a conductive filler dispersed therein.

8. An intermediate transfer member in accordance with claim 1 and wherein said member has a resistivity of from about $10^{10}$ to about $10^{12}$ ohm/square, and a modulus of from about 3,000 to about 5,000 MPa, and said silane-containing polyamideimide has a glass transition temperature of from about 200° C. to about 400° C.

9. An intermediate transfer member in accordance with claim 1 wherein said silane-containing polyamideimide is present in an amount of from about 80 to about 90 weight percent, said silane-containing polymer layer further comprises a filler component of carbon black present in an amount of from about 10 to about 20 weight percent, wherein the total thereof of said silane-containing polyamideimide and said filler component of carbon black is about 100 weight percent.

10. An intermediate transfer member in accordance with claim 1 further comprising an outer release layer positioned on said silane-containing polymer layer wherein said release layer comprises a material selected from the group consisting of a fluorinated ethylene propylene copolymer, a polytetrafluoroethylene, a polyfluoroalkoxy polytetrafluoroethylene, a fluorosilicone, and a tetrapolymer of vinylidene fluoride, hexafluoropropylene, tetrafluoroethylene and a cure site monomer.

11. An intermediate transfer member in accordance with claim 1 wherein said silane-containing polyamideimide has a glass transition temperature of from about 275° C. to about 340° C.

12. An intermediate transfer member comprising a polyimide supporting substrate, and thereover a layer comprised of a mixture of a silane-containing polyamideimide, and a conductive component, wherein said silane-containing polyamideimide is selected from the group consisting of those represented by the following formulas/structures

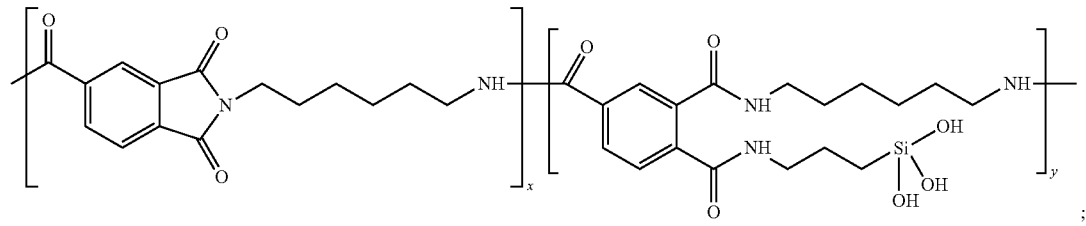

;

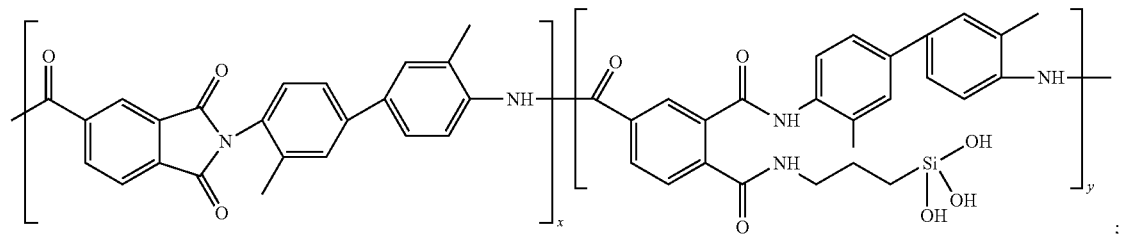

;

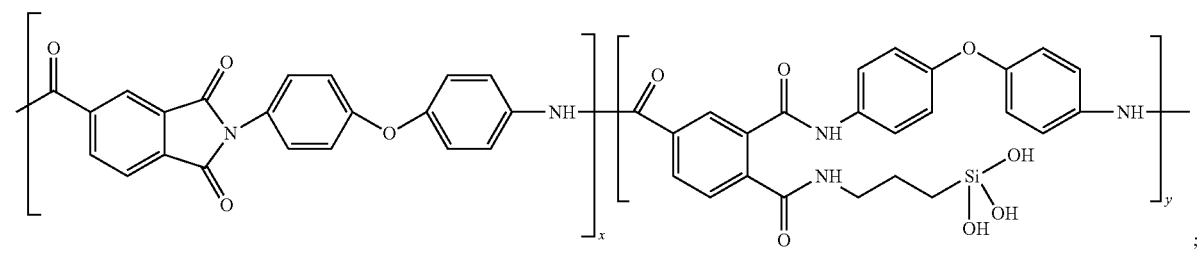

;

-continued

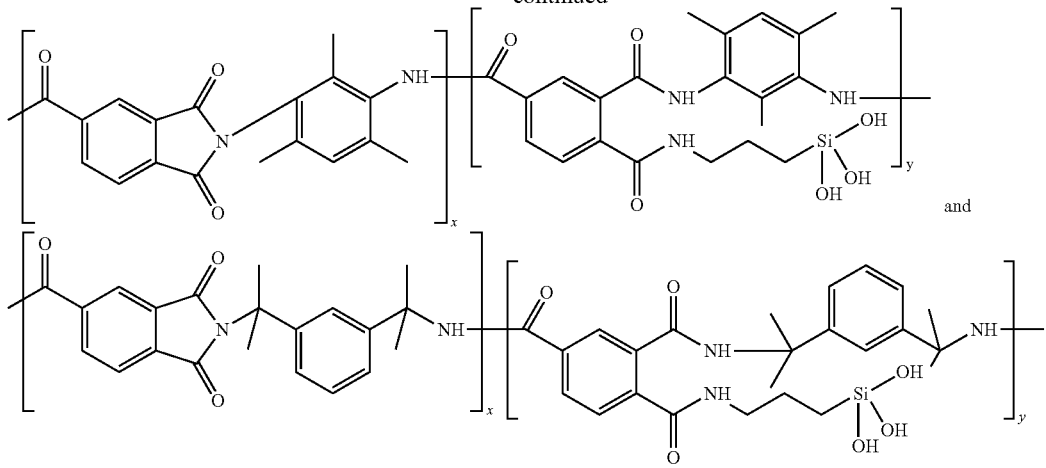

where x is from about 65 to about 90 mole percent, y is from about 10 to about 35 mole percent and the total of x and y is about 100 mole percent.

13. An intermediate transfer member in accordance with claim 12 wherein where x is from about 70 to about 80 mole percent, y is from about 20 to about 30 mole percent, and the total of x and y is about 100 mole percent; and said conductive component is carbon black.

14. An intermediate transfer member in accordance with claim 12 wherein said silane-containing polyamideimide is present in an amount of from about 60 to about 97 weight percent, and said conductive component is present in an amount of from about 3 to about 40 weight percent, and wherein the total of said silane-containing polyamideimide, and said filler is about 100 weight percent, and said supporting substrate is a polyimide/polyanilide.

15. An intermediate transfer member in accordance with claim 12 wherein said member has a resistivity of from about $10^{10}$ to about $10^{11}$ ohm/square.

16. An intermediate transfer member in accordance with claim 12 wherein said conductive component of said mixture has particle size diameter retention of from about 100 to about 200 nanometers.

17. An intermediate transfer member in accordance with claim 12 wherein said silane-containing polyamideimide is represented by the following formula/structure

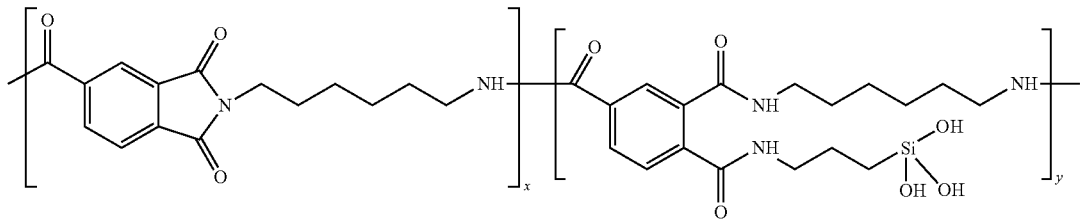

where x is from about 70 to about 90 mole percent, y is from about 10 to about 30 mole percent mole percent, and the total mole percent sum of x and y is about 100.

* * * * *